(12) United States Patent
Choi

(10) Patent No.: US 6,725,063 B2
(45) Date of Patent: Apr. 20, 2004

(54) ANNOUNCEMENT BROADCASTING APPARATUS IN UNIVERSAL MOBILE TELECOMMUNICATION SYSTEM

(75) Inventor: Seong-Jo Choi, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 09/998,205

(22) Filed: Dec. 3, 2001

(65) Prior Publication Data

US 2002/0094802 A1 Jul. 18, 2002

(30) Foreign Application Priority Data

Jan. 12, 2001 (KR) .......................................... 2001-1722

(51) Int. Cl.[7] ................................................. H04M 1/64
(52) U.S. Cl. ............... 455/563; 379/88.22; 379/213.01; 704/270
(58) Field of Search ............................. 379/71, 72, 73, 379/76, 88.07, 88.09, 88.16, 88.22, 88.27, 88.28, 213.01; 455/412.1, 414.1, 563; 704/258, 270

(56) References Cited

U.S. PATENT DOCUMENTS

| | | | | |
|---|---|---|---|---|
| 5,029,200 A | * | 7/1991 | Haas et al. ............... | 379/88.18 |
| 5,638,425 A | * | 6/1997 | Meador et al. .......... | 379/88.01 |
| 6,173,250 B1 | * | 1/2001 | Jong ............................. | 704/3 |
| 6,298,043 B1 | | 10/2001 | Mauger et al. | |
| 6,385,196 B1 | * | 5/2002 | Hayball et al. ............. | 370/356 |
| 6,477,494 B2 | * | 11/2002 | Hyde-Thomson et al. .. | 704/260 |
| 2001/0025345 A1 | * | 9/2001 | Jung et al. ................... | 713/200 |

* cited by examiner

Primary Examiner—Scott L. Weaver
(74) Attorney, Agent, or Firm—Robert E. Bushnell, Esq.

(57) ABSTRACT

An announcement broadcasting apparatus in a Universal Mobile Telecommunication System (UMTS), comprising a message storage unit for storing a plurality of external announcement messages therein, a message sending/receiving interface responsive to an announcement message sending request from a higher-order processor for reading parallel data from the message storage unit, converting the read parallel data into serial data and outputting the converted serial data, a unique message information storage unit for storing information about locations and sizes of the announcement messages stored in the message storage unit and outputting the stored information about the location and size of a corresponding one of the announcement messages in response to the announcement message sending request from the higher-order processor, and a controller responsive to the announcement message sending request from the higher-order processor for detecting information about a location and size of each phoneme of the corresponding announcement message from the unique message information storage unit according to pattern data of the corresponding announcement message, forming an array of the detected information and sending the formed information array to the higher-order processor via the message sending/receiving interface.

9 Claims, 3 Drawing Sheets

ANNOUNCEMENT BROADCASTING APPARATUS IN UNIVERSAL MOBILE TELECOMMUNICATION SYSTEM

CLAIM OF PRIORITY

This application makes reference to, incorporates the same herein, and claims all benefits accruing under 35 U.S.C §119 from an application entitled Announcement Broadcasting Apparatus in the System of UMTS earlier filed in the Korean Industrial Property Office on Jan. 12, 2001, and there duly assigned Ser. No. 2001-1722 by that Office.

BACKGROUND OF THE INVENTION

1. Field of the Invention

The present invention relates to a Universal Mobile Telecommunication System (herein below, referred to as UMTS), and more particularly to an announcement broadcasting apparatus in the UMTS.

2. Description of the Related Art

In general, an announcement broadcasting apparatus is used when a fault occurs in a switching system during its operation, or a user requests a particular service for his or her special purpose. In particular, the apparatus is used to check the cause of a fault occurring within the switching system and send a message indicative of the checked cause to a user requesting a call to inform him or her of the current status of the switching system, when provision of a service becomes impossible due to the fault occurring in the switching system. The apparatus is also adapted to provide an announcement message to a user when the user inquires about his or her status from the switching system. Alternatively, a user may temporarily request a function such as an absence-indicating function, a call termination-rejecting function or the like from the switching system, so that when another user desires the connection of a call to the user from the switching system, the user may reject the call connection or may not receive the call. In this case, the apparatus provides an announcement message to another user. U.S. Pat. No. 6,298,043 to Roy Harold Mauger et al. entitled Communication system Architecture And A Connection Verification Mechanism Therefor briefly discusses an example of a call announcement server that stores and sends prerecorded system announcements that provide verbal instructions or verbal reassurances to users attempting to utilize a broadband (UMTS) interface.

Announcement message services in a UMTS are classified into a fixed type provided when a fault occurs in the system, and an edited type provided in response to an additional service request from the user. The announcement broadcasting apparatus includes a memory for storing a fixed message to be sent when a fault occurs within the system. When a fault occurs in the system, the apparatus receives a set of information about numbers of messages and the number of repetitive messages sent from a higher-order processor. At this time, when a user requests an additional service from the system in a state in which message information to be serviced by the apparatus has been stored in the memory, the apparatus combines variable information of the higher-order processor and the information stored in the apparatus by a request for the additional service from the higher-order processor so as to provide a certain announcement message service to the user.

Announcement messages are stored in the memory while being classified into a fixed type and an edited type. The memory is configured with a flash memory, so information stored in the memory always exists therein until it is erased. Various information, including information about the memory locations and sizes of the fixed and edited messages, message access information, and information about the format of the edited message are stored in the flash memory. Thus, even though a board is separated from the announcement broadcasting apparatus, a service provision is possible.

SUMMARY OF THE INVENTION

Therefore, an object of the present invention is to provide an announcement broadcasting apparatus in a Universal Mobile Telecommunication System (UMTS) which is capable of applying message pattern information to messages to be sent, thereby enabling the messages to be sent and received without being classified into a fixed type and an edited type.

In accordance with the present invention, the above and other object can be accomplished by the provision of an announcement broadcasting apparatus in a UMTS, comprising message storage means for storing a plurality of external announcement messages therein; a message sending/receiving interface responsive to an announcement message sending request from a higher-order processor for reading parallel data from said message storage means, converting the read parallel data into serial data and outputting the converted serial data; unique message information storage means for storing information about locations and sizes of said announcement messages stored in said message storage means and outputting the stored information about the location and size of a corresponding one of said announcement messages in response to the announcement message sending request from said higher-order processor; and control means responsive to said announcement message sending request from said higher-order processor for detecting information about a location and size of each phoneme of said corresponding announcement message from said unique message information storage means according to pattern data of said corresponding announcement message, forming an array of the detected information and sending the formed information array to said higher-order processor via said message sending/receiving interface.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
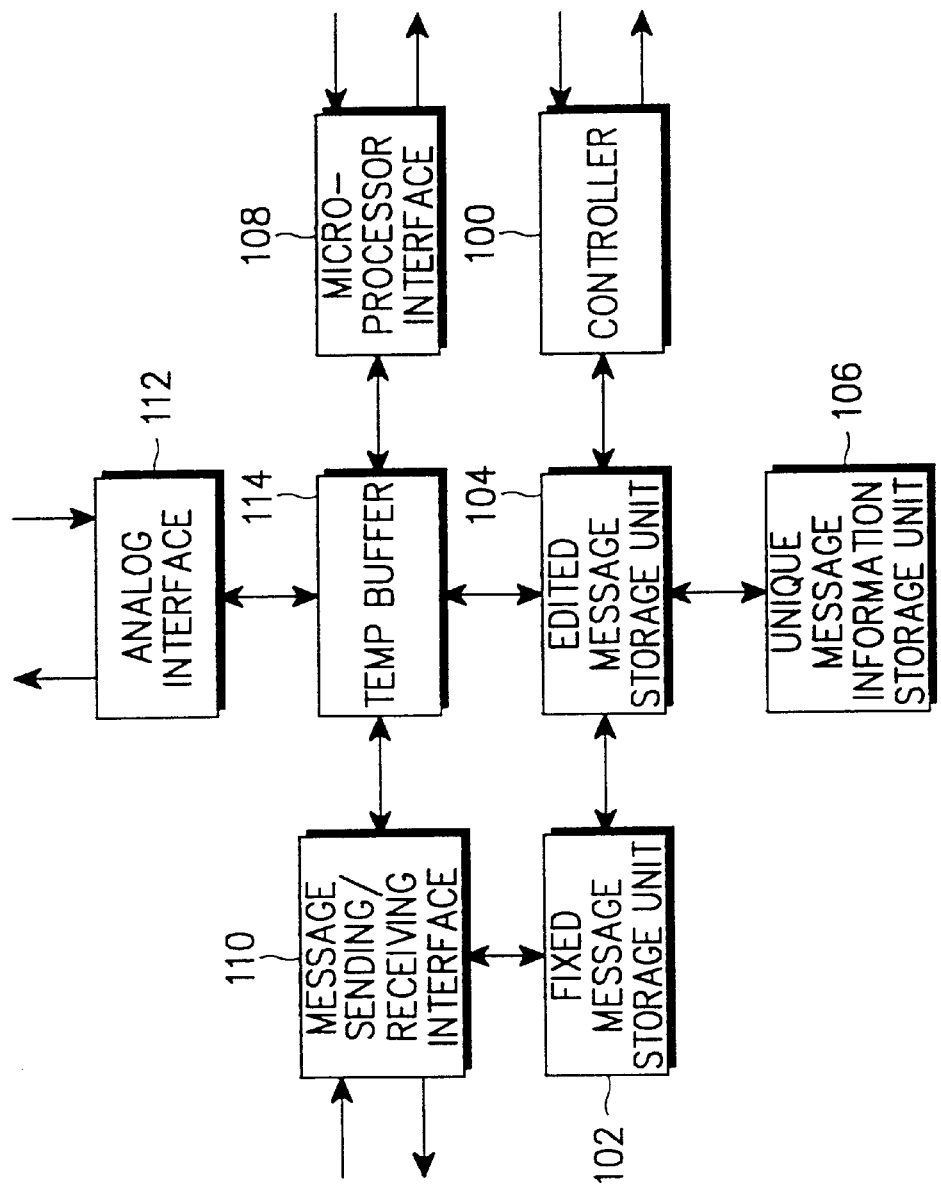
FIG. 1 is a block diagram illustrating the construction of a contemplated announcement broadcasting apparatus in a UMTS.

FIG. 1 is a block diagram illustrating the construction of an initially contemplated announcement broadcasting apparatus for use in a UMTS. As shown in this drawing, the announcement broadcasting apparatus comprises a controller 100, which is a processor block, a fixed message storage unit 102 and edited message storage unit 104, which are memory blocks for storing announcement messages, a unique message information storage unit 106 for storing information about the states of the announcement messages stored in the memory blocks 102 and 104, a microprocessor interface 108 for communicating with a higher-order processor, a message sending/receiving interface 110 for reading the announcement messages stored in the memory blocks 102 and 104, converting the read messages into a serial stream signal and sending the converted signal, an analog interface 112 for sending an analog signal, and a temp buffer 114 for temporarily storing an analog signal from the analog interface 112, a serial stream signal from the message sending/receiving interface 110 and a signal input from the higher-order processor via the microprocessor interface 108.

The controller 100 is composed of an MC68306 microprocessor and an SRAM (static random access memory) which is a temporary data memory having a 128K by 16 word size for storing a program. The microprocessor mainly functions to control the operation of each constituent element block within the announcement broadcasting apparatus and communications between the blocks and higher-order blocks. The microprocessor also acts to perform a function corresponding to a command from a higher-order processor. It is also adapted to detect an internal state and alarm state of the apparatus and report the detected results to the higher-order processor or provide a visual indication thereof to a user. Also, the microprocessor employs a periodical scanning and interrupting operation to perform a recoding function.

To control the sending of an announcement message, the microprocessor of controller 100 updates information about the memory location of the announcement message in response to an external interrupt signal which is generated every 128 ms. The microprocessor interface 108 is adapted to perform a microprocessor interfacing operation and manage an internal basic state. This interface 108 collects information about the internal state and alarm state such that the higher-order processor can read the collected information. It also enables two-way communications between the microprocessor in the controller 100 and the higher-order processor so as to improve reliability of the apparatus. To this end, the microprocessor interface 108 includes an ASIC (application-specific integrated circuit) chip and DPRAM (dual port RAM).

The analog interface 112 includes a chip for converting an analog signal into a digital signal or vice versa, a switch for selecting time information and message information, a connector for connecting the interface 112 to a handset of a telephone, and a microphone jack. The analog interface 112 mainly functions to store and output a message in an analog manner.

The message sending/receiving interface 110 sends and receives speech information in the form of a 2.048 MHz pulse code modulated (PCM) stream on the basis of an 8 KHz frame synchronization and performs a serial-to-parallel data conversion and parallel-to-serial data conversion. Also, the message sending/receiving interface 110 logically reads announcement messages from the fixed and edited message storage units 102 and 104 to send the read messages, and provides diverse paths for the PCM stream. The message sending/receiving interface 110 can send a maximum of 64 announcement messages.

The temp buffer 114 is configured with a memory having a size of 512 Kbytes for temporarily storing a maximum 64 sec-sized messages. The main function of the temp buffer 114 is to temporarily store data therein from the analog interface 112, the message sending/receiving interface 110 and the microprocessor interface 108, and to store data in the fixed message storage unit 102 under the control of the microprocessor of controller 100.

The fixed message storage unit 102 is modularized using a 2-Mbyte flash memory in such a fashion that it has a maximum of four modules, each being 8 Mbytes in size. The main function of the fixed message storage unit 102 is to store a fixed announcement message therein. Also, since the fixed message storage unit 102 is configured with a nonvolatile memory such as a flash memory, a message stored therein is preserved permanently. The flash memory is configured with 32 blocks per chip, each of which has a size of 64 Kbytes, and performs erasing and programming functions for each block. The fixed message storage unit 102 can store 512 announcement messages on an 8 second basis.

The edited message storage unit 104 has the same configuration as that of the fixed message storage unit 102, with the exception that a single module is employed although it is the same in size as each module of the storage unit 102. The main function of the edited message storage unit 104 is to store speech information associated with an edited announcement message to be sent. The storage unit 104 has a storage capacity amounting to 8 Mbytes at the maximum.

The unique message information storage unit 106 is configured with a flash memory having a size of 512 Kbytes, and performs erasing and programming functions. The main function of the unique message information storage unit 106 is to store information regarding the memory location, size and end of a fixed announcement message when the announcement message is stored in the fixed message storage unit 102. The unique message information storage unit 106 has information regarding the pattern of an edited announcement message. At the time when the microprocessor of the controller 100 is initialized, it stores the pattern information in the data memory of the controller 100 to use it for message servicing. Further, the microprocessor of controller 100 updates the pattern information if a message modification is made during message servicing.

Message recording of the announcement broadcasting apparatus with the above-described construction may be carried out according to any one of three methods as will be discussed below.

In the first method, an announcement message is input and stored in the temp buffer 114 via the analog interface 112 in the form of an analog signal. The stored announcement message is then stored in the fixed message storage unit 102 under the control of the microprocessor of controller 100.

In the second method, an announcement message is input in the form of a PCM stream of 64 Kbps to the message sending/receiving interface 110, which in turn performs a serial-to-parallel data conversion operation for the input message and stores the resulting message in the temp buffer 114. The stored announcement message is then stored in the fixed message storage unit 102 under the control of the microprocessor of controller 100.

In the third method, an announcement message is input and stored in the temp buffer 114 via the microprocessor interface 108 in the form of a file. The stored announcement message is then stored in the fixed message storage unit 102 under the control of the microprocessor of controller 100.

Figure 2:
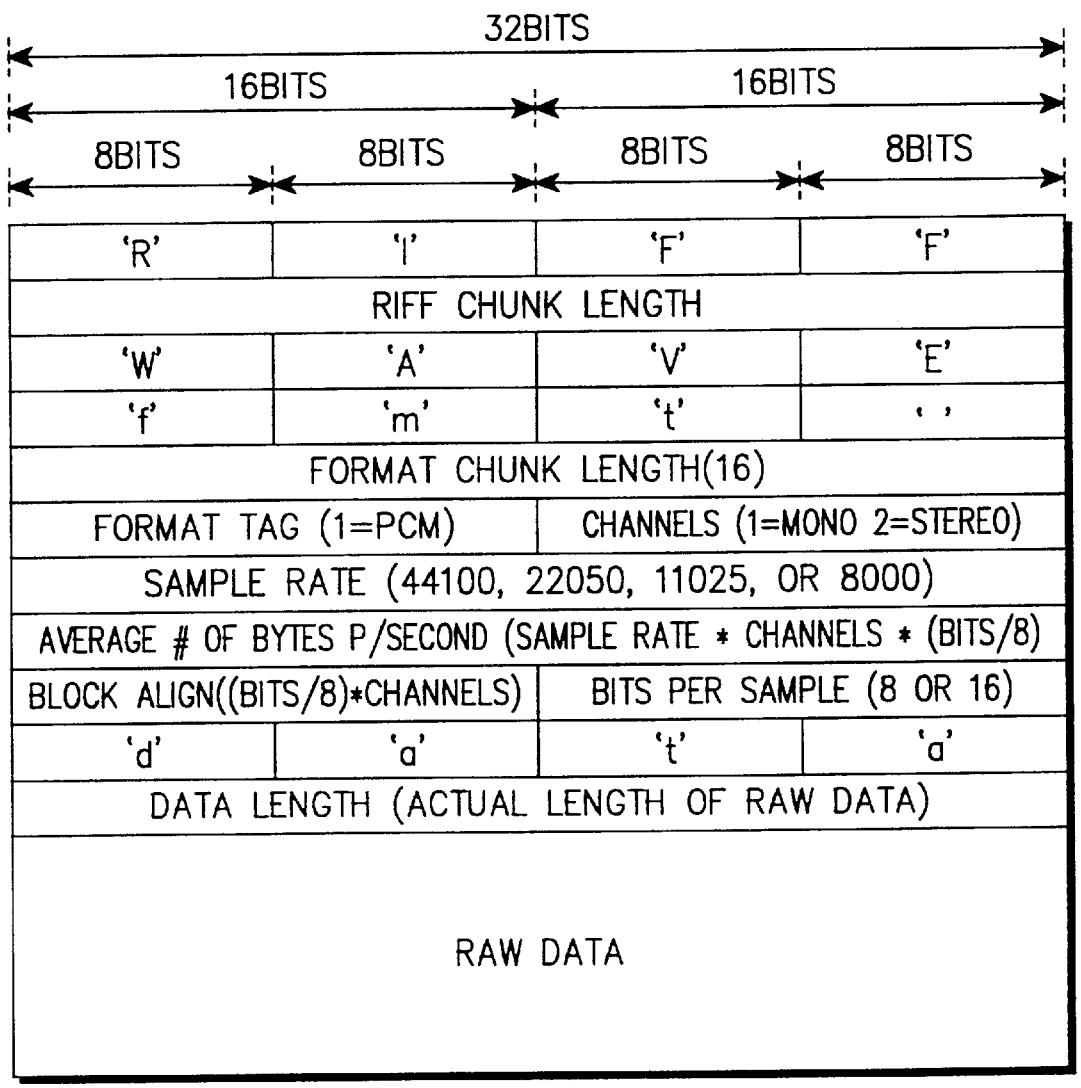
FIG. 2 is a view illustrating a WAV file format of an announcement message.

FIG. 2 shows a file format of a message stored in the above manner. From the file format of this drawing, it can be seen that only raw data from a higher-order processor is loaded and stored into the temp buffer 114. In an edited message recording method, edited data is generated from an external system and then stored in the temp buffer 114 through a serial port of the microprocessor of controller 100. The stored data is in turn stored in the edited message storage unit 104 under the control of the microprocessor of controller 100.

In an announcement message reproduction method of the announcement broadcasting apparatus, a Bargin-In mode (means that a message is continuously repeated, and when a subscriber requests the message, the repeated message may be reproduced from any point in the message rather that the start of the message) and Non-Bargin-In mode (means that when there is a need to provide a subscriber with an announcement broadcasting service, the message should always be reproduced from the start of the message) are together employed and an announcement message is reproduced along two paths, one based on the analog interface 112 and the other based on the message sending/receiving interface 110. For message reproduction, the microprocessor of controller 100 manages an array of information, regarding the memory location and size of an announcement message to be sent, in such a manner that it can change the memory location of the message, reduce the size thereof and send the resulting message. Upon receiving a message interruption request during the message sending, the microprocessor of controller 100 clears the information about the memory location and size of the message.

The above-described announcement broadcasting apparatus of the switching system however, has a problem in that the edited message recording process is so complex that it becomes complicated to manufacture a board of the apparatus and manage its configuration. The announcement message services are provided under the condition that they are classified into a fixed type and an edited type. In this regard, when new contents are produced for an edited message, the edited message must be re-created, which would make it difficult for an operator to produce, modify and add new message contents. The foregoing announcement broadcasting apparatus has another problem in that the memory is degraded in efficiency because it has basic units of the minimum 64 Kbytes and stores a message of the maximum 512 Kbytes. For example, provided that a message to be stored has a 9 sec size, two blocks, which are basic units of 64 Kbytes, will be used in the memory, resulting in a memory area, corresponding to 7 sec, becoming a dummy area to be lost.

Figure 3:
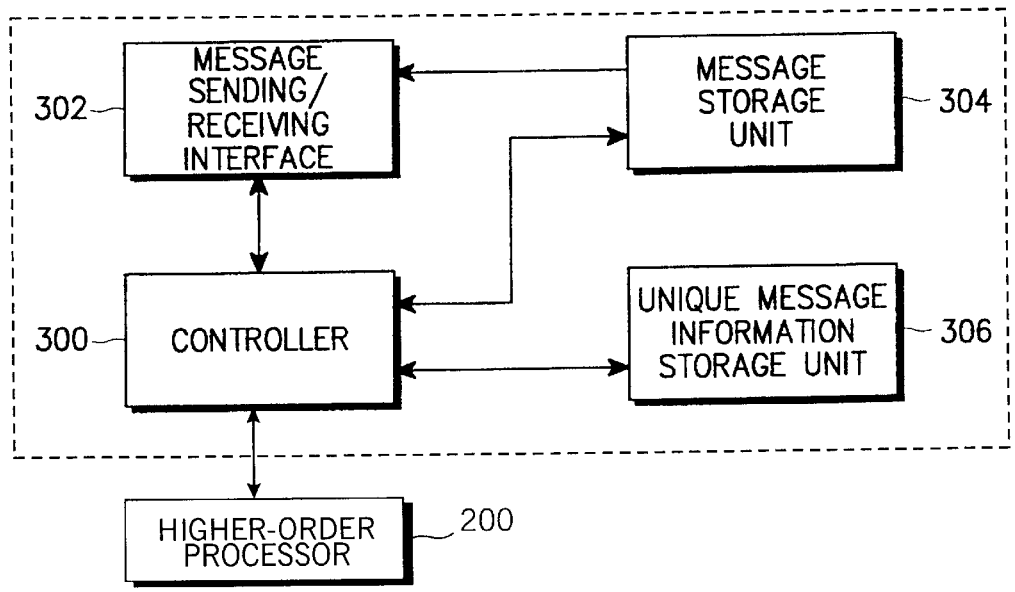
FIG. 3 is a block diagram illustrating the construction of an announcement broadcasting apparatus in a UMTS according to a preferred embodiment of the present invention.

FIG. 3 is a block diagram illustrating the construction of an announcement broadcasting apparatus in a UMTS according to a preferred embodiment of the present invention. The UMTS is comprised of a mobile switching center (MSC: not shown), a base station (BS: not shown) and a mobile station (MS: not shown), and the MSC includes a higher-order processor 200 connected to the announcement broadcasting apparatus. As shown in this drawing, the announcement broadcasting apparatus comprises a message sending/receiving interface 302, a message storage unit 304, a unique message information storage unit 306 and a controller 300. In terms of hardware, the announcement broadcasting apparatus has a memory (not shown) for storing an announcement message, and the higher-order processor is connected to the controller 300. The announcement broadcasting apparatus merely has only information about a stored state of the announcement message in the memory, and cannot form and send the message independently. That is, the announcement broadcasting apparatus is designed to operate under the control of the higher-order processor to send an announcement message. In terms of software, phoneme-unit data or syllable-unit data is stored in a disc of the higher-order processor, and can be generated along with pattern information of an announcement message to be serviced.

The announcement broadcasting apparatus of FIG. 3 basically performs a message reproduction function in the Bargin-In mode or the Non-Bargin-In mode. The apparatus also performs a message storage function in a file load manner where an operator analog-records a message and then the analog-recorded message is digitized using, for example, a sound card tool in a personal computer, to create a file in the form of a commercially available WAV file without modifying it and stores the created file. The memory has basic units of 1024 bytes, which is large enough not to limit the length of an announcement message. The present invention provides the operator with environments capable of creating and using new formats of messages on the basis of data stored in the memory.

A detailed description will hereinafter be given of the operations of the respective components in the announcement broadcasting apparatus according to the preferred embodiment of the present invention with reference to FIG. 3.

The controller 300 is configured with, but not shown, an MPC8260 microprocessor, a Boot program memory, an application program memory and an SDRAM (synchronous dynamic RAM) which is a data memory. In response to a state request from the higher-order processor 200, the controller 300 initializes the unique message information storage unit 306, determines whether there is at least one announcement message stored in the message storage unit 304, and reports the determined result to the higher-order processor 200. If there is an announcement message stored in the message storage unit 304, the controller 300 checks the identification ID, assigned to each of the syllables of the announcement message, assigned to the first and last syllables of the stored message to determine whether the stored message is normal or abnormal and, upon detecting an error from the message, reports to the higher-order processor 200 that the message is abnormal so that the message can be downloaded again from the higher-order processor 200.

Figure 4A:
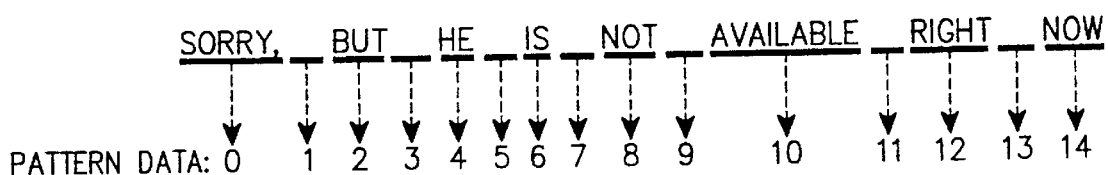
FIGS. 4A and 4B are views illustrating examples of stored pattern data of announcement messages in accordance with the present invention.
Figure 4B:
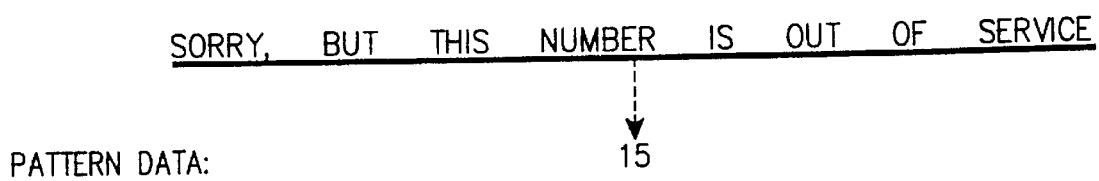

A system operator can display a message storage state using an operator's terminal and if necessary, a message storage request is transmitted from the higher-order processor 200 to controller 300 when loading the message by the operator's request. Upon receiving a message storage request from the higher-order processor 200, the controller 300 acknowledges it and informs the processor of a message storage enable or disable state. In the message storage enable state, the controller 300 receives, from the higher-order processor 200, a message number and a message file to be stored and stores them in its SDRAM in the WAV format. Thereafter, the controller 300 analyzes header data of the stored file, detects the size of the file from the analyzed result and stores the corresponding announcement message in the message storage unit 304. Announcement messages are stored as phoneme-unit pattern data as shown in FIGS. 4A and 4B. The controller 300 then updates the contents stored in the unique message information storage unit 306 with information regarding the location and size of the stored message.

When the controller 300 receives, from the higher-order processor 200, the phoneme-unit pattern data of an announcement message to be sent, it then detects information about the location and size of each phoneme of the announcement message from the unique message information storage unit 306 and forms an array of the detected information. Thereafter, synchronously with an interrupt signal that is generated from the message sending/receiving interface 302 at intervals of 128 ms, the controller 300 changes the location information and reduces the size information. The message sending/receiving interface 302, which may preferably include, but not shown, an EPLD (erasable programmable logic device) and DPRAM (dual port RAM), is operated under the control of the controller 300 to read 8-bit parallel data from the message storage unit 304, convert the read parallel data into serial data and send the converted serial data to the higher-order processor 200. Namely, the interface 302 receives a frame at 8 KHz and sends 128 PCM stream data at 64 Kbps.

The DPRAM in the interface 302 is interoperable with the controller 300 for message sending. That is, in response to a message sending request from the higher-order processor 200, the DPRAM in the interface 302 exchanges PCM stream data with the controller 300.

For access to the message storage unit 304, the controller 300 logically generates a control signal such that the reading of data from the storage unit 304 is possible up to a maximum of four times for 3.9 ms. The message storage unit 304 is configured with a flash memory being 40 Mbytes in size and modularized in units of 8 Mbytes so that it is detachable from the apparatus. The storage unit 304 stores an announcement message therein under the control of the controller 300, and outputs the stored message in response to a message sending request. In the present embodiment, the message storage unit 304 has basic units of 1024 bytes, which are minimum units for message storage.

The unique message information storage unit 306 may preferably be a 512-Kbyte flash memory. This unique message information storage unit 306 stores unique message information consisting of information about the location and size of an announcement message stored in the message storage unit 304, and one byte positioned in the middle portion of the message. The unique message information is updated whenever a new message from the higher-order processor 200 is stored in the message storage unit 304. This unique message information is also transferred as initialization information to the SDRAM of the controller 300 when the system is rebooted.

In accordance with the preferred embodiment of the present invention, for a fixed message service, if the higher-order processor 200 provides information about a unique announcement message number, as shown in FIG. 4B, and the number of repetitive message sendings to the announcement broadcasting apparatus, then the controller 300 in the apparatus checks the state of an announcement message corresponding to the provided information to determine whether the announcement message is serviceable, and reports the determined result to the higher-order processor 200.

For an edited message service, edited message data and an edited message pattern in the controller 300 are initialized in the initial state. Thereafter, in response to a message sending request from the higher-order processor 200, the controller 300 checks the state of a corresponding announcement message to determine whether the announcement message is serviceable, and reports the determined result to the higher-order processor 200. At this time, the higher-order processor 200 provides information, to the announcement broadcasting apparatus, about the pattern of an announcement message to be sent, as shown in FIG. 4A, thereby enabling the message to be sent and received without its discrimination between a fixed type and an edited type. Moreover, no message storage is performed via the message sending/receiving interface 302 or analog interface, thereby preventing a degradation in message quality. Furthermore, a recording file is created in a format operable by any operator, and the message storage unit 304 has basic units of 1024 bytes, which are minimum units for message storage without discrimination between a fixed type and an edited type. Accordingly, each message is stored in phoneme units, which are minimized message units, resulting in an increase in memory efficiency. In other words, in the announcement broadcasting apparatus according to the preferred embodiment of the present invention, announcement messages are stored as phoneme-unit pattern data as shown in FIGS. 4A and 4B, so an operator can readily create a new message by combining the stored phoneme-unit pattern data.

As apparent from the above description, the present invention provides an announcement broadcasting apparatus in a UMTS which has a simplified function and a database applicable to all messages irrespective of fixed and edited types, thereby making it simple to manage the configuration of hardware. Further, announcement messages are stored as phoneme-unit pattern data, thereby enabling an operator to readily create a new message by combining the stored phoneme-unit pattern data. A message memory is provided to store messages in units of 1024 bytes, resulting in an increase in memory efficiency.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An announcement broadcasting apparatus in a Universal Mobile Telecommunication System (UMTS), comprising:
   a message storage unit for storing a plurality of external announcement messages therein;
   a message sending/receiving interface responsive to an announcement message sending request from a higher-order processor for reading parallel data from said message storage unit, converting the read parallel data into serial data and outputting the converted serial data;
   a unique message information storage unit for storing information about locations and sizes of said announcement messages stored in said message storage unit and outputting the stored information about the location and size of a corresponding one of said announcement messages in response to the announcement message sending request from said higher-order processor; and
   controller responsive to said announcement message sending request from said higher-order processor for detecting information about a location and size of each phoneme of said corresponding announcement message from said unique message information storage unit according to pattern data of said corresponding announcement message, forming an array of the detected information and sending the formed information array to said higher-order processor via said message sending/receiving interface.

2. The announcement broadcasting apparatus according to claim 1, wherein said message storage unit includes a flash memory, said flash memory having basic units of 1024 bytes, said basic units being minimum units for message storage.

3. The announcement broadcasting apparatus according to claim 1, wherein said unique message information storage unit is adapted to update said information about the location and size of said corresponding announcement message whenever a new message is stored in said message storage unit.

4. The announcement broadcasting apparatus according to claim 1, wherein said controller is operative in response to a message state request from said higher-order processor to initialize said unique message information storage unit and send information about stored states of said announcement messages in said message storage unit to said higher-order processor.

5. The announcement broadcasting apparatus according to claim 1, wherein said controller is operative in response to a message storage request from said higher-order processor to receive a message number and a file to be stored, from said higher-order processor, store them in a synchronous dynamic random access memory, analyze a size of the file on the basis of header data of the file and store said file in said message storage unit in accordance with the analyzed result.

6. An announcement broadcasting apparatus in a Universal Mobile Telecommunication System (UMTS), wherein the UMTS is comprised of a mobile switching center, a base station and a mobile station, and the mobile switching center includes a higher-order processor connected to the announcement broadcasting apparatus, the announcement broadcasting apparatus comprising:

a message sending/receiving interface, a message storage unit, a unique message information storage unit and a controller connected to the higher-order processor;

said message storage unit having announcement messages stored therein as phoneme-unit pattern data under control of said controller in response to a message storage request from said higher-order processor;

said unique message information storage unit having information stored therein regarding the location and size of each of the stored announcement messages and outputting the stored information about the location and size of a corresponding one of said announcement messages to said controller in response to an announcement message sending request sent to said controller from said higher-order processor;

said controller receiving, from the higher-order processor, phoneme-unit pattern data of an announcement message to be sent, said phoneme-unit pattern data corresponding to separate phoneme-unit data stored in said message storage unit to form an edited message;

said controller receiving, from the higher-order processor, an announcement message number of an announcement message to be sent, said announcement number corresponding to a fixed message stored in said message storage unit;

said message sending/receiving interface being operated under the control of the controller, in response to a message sending request from the higher-order processor, to read 8-bit parallel data, corresponding to the fixed message or the edited message, from the message storage unit, convert the read 8-bit parallel data into serial data and send the converted serial data to the higher-order processor via said controller.

7. The announcement broadcasting apparatus as set forth in claim 6, wherein said controller analyzes portions of said announcement messages to be sent to said higher-order processor to determine whether the announcement message to be sent is normal or abnormal, said higher-order processor downloading the announcement message for storage in said message storage unit when it is determined that the announcement message to be sent is abnormal.

8. The announcement broadcasting apparatus as set forth in claim 7, wherein said controller receives, from the higher-order processor, said announcement message including a corresponding announcement message number and an announcement message file to be stored and stores them in an internal memory, analyzes header data of the stored announcement message file, detects the size of the file from the analyzed result and stores the corresponding announcement message in the message storage unit as said phoneme-unit pattern data, and then the controller updates the contents stored in the unique message information storage unit with information regarding the location and size of the announcement message stored in said message storage unit.

9. The announcement broadcasting apparatus as set forth in claim 6, wherein said message sending/receiving interface receives a frame of data from said message storage unite at 8 KHz and sends a 128 pulse code modulated stream data at 64 Kbps to said controller.

* * * * *